June 13, 1950  V. GUILLEMIN, JR  2,510,973
BICYCLE ERGOMETER
Filed July 12, 1946
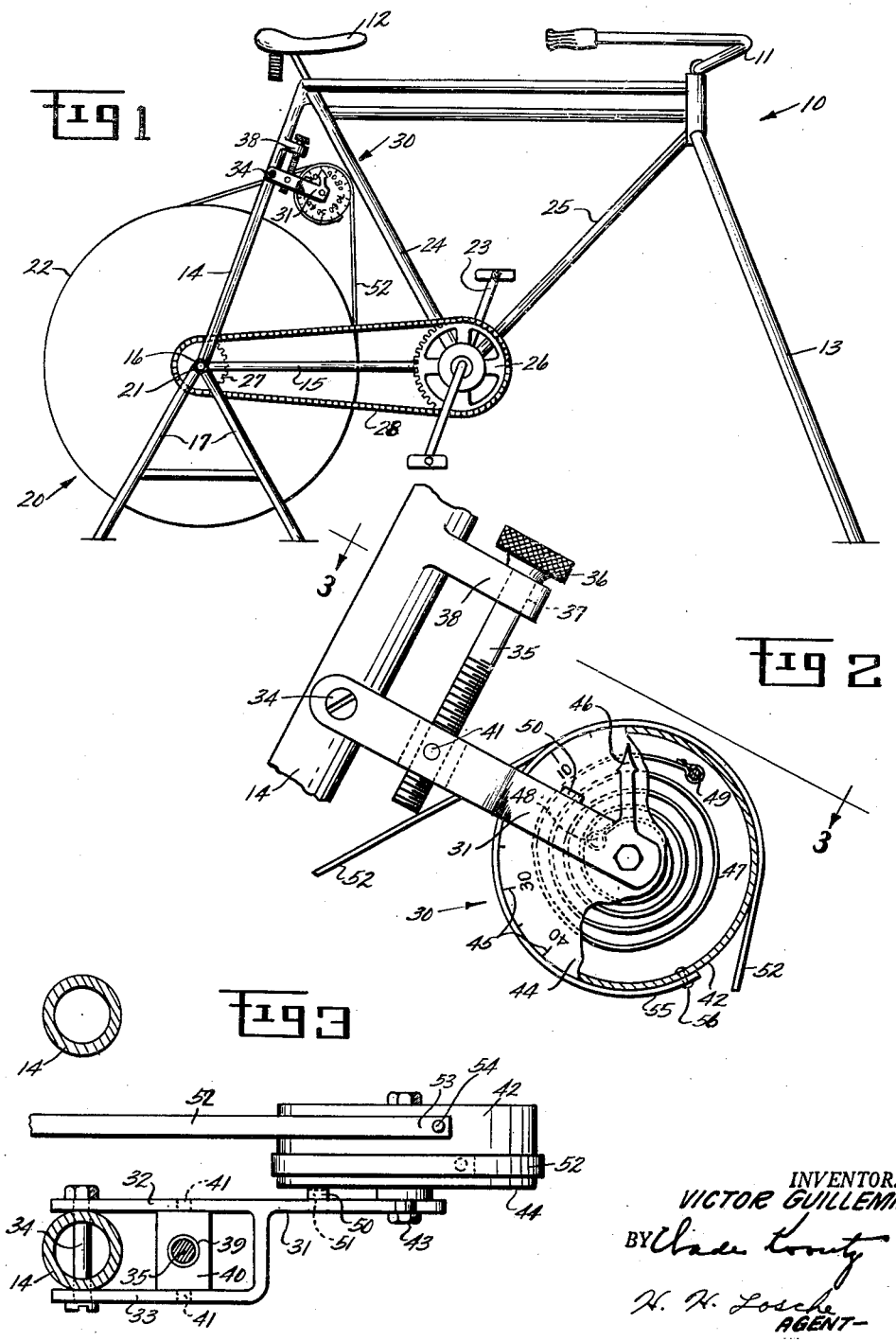
INVENTOR.
VICTOR GUILLEMIN JR.
BY
AGENT- Patented June 13, 1950

2,510,973

UNITED STATES PATENT OFFICE 2,510,973

BICYCLE ERGOMETER

Victor Guillemin, Jr., Dayton, Ohio

Application July 12, 1946, Serial No. 683,195

5 Claims. (Cl. 73—381)

(Granted under the act of March 3, 1883, as amended April 30, 1928; 370 O. G. 757)

The invention described herein may be manufactured and used by or for the Government for governmental purposes without payment to me of any royalty thereon.

This invention relates to a frictional braking dynamometer device for determining the amount of work done or energy expended during exercise by a human subject operating the device.

The need for a device of this kind arose in connection with research directed toward reducing the incidence of aeroembolism (bends) in flying personnel on high altitude missions. The bends, which frequently cause pain of sufficient intensity to seriously reduce the effectiveness of flying personnel, were thought to be caused by bubbles of nitrogen forming in the blood at high altitudes. The bubble formation may be prevented by removing the nitrogen from the flyer's body before he goes on a mission. This so-called "denitrogenation" may be accomplished by allowing the flyer to breathe pure oxygen for a suitable period before the ascent, and the process may be hastened by allowing him to exercise, thus increasing the rate and depth of his breathing. To get the desired results, it was considered to be necessary to measure and control the rate of work done during this exercise.

It was found that there was no device available that was suitable for the above purpose, and the apparatus, which is the subject of the present invention, was therefore developed. In addition to its original purpose, this bicycle ergometer has been used in various aeromedical development projects where it is necessary to measure human work performance. It has been used, for example, to give a measured work load to flying personnel in altitude chambers during tests of oxygen regulators, in order to determine whether their oxygen delivery is adequate to take care of the work required in the performance of flight duties. Many other uses will become apparent as the description proceeds.

The principal object of my invention is to provide a frictional dynamometer device in which a single differential force meter measures the net tangential force between the frictional co-acting elements.

Another object of my invention is to provide a bicycle frame arranged to rest in a stationary upright position having a foot propelled rear wheel with a smooth periphery in frictional engagement with a band passing substantially therearound having ends connected in opposed relation to a single differential force meter means that indicates the net force exerted on the propelled wheel by the drag of the band.

A further object of my invention is to provide a bicycle ergometer device having a foot propelled freely rotatable rear wheel with a smooth flat periphery in which a band frictionally engages the wheel periphery and has ends partially passing in opposite directions around an indexed drum rotatively supported by a lever arm adjustably pivotally mounted on the bicycle frame, the indexed drum being spring biased in one rotative direction with the indices in registering relation with a pointer of the lever arm such that adjustment of the pivoted lever arm varies the band tension and rotation of the wheel produces a difference in tension in the ends of the band which difference actuates the indexed drum against the spring bias to register the net tangential force acting on the wheel periphery denoting work performance.

Other objects and advantages will be apparent as the description proceeds taken in conjunction with the accompanying drawing wherein for the purpose of illustration I have shown a simple preferred embodiment of my invention in which:

Fig. 1 is a side elevational view of the bicycle ergometer;

Fig. 2 is an enlarged cutaway view, partly in section, of the differential force meter as suspended in the bicycle frame; and Fig. 3 is a cross section taken on the line 3—3 of Fig. 2, looking in the direction of the arrows.

Referring particularly to Fig. 1 there is shown a bicycle frame, generally referred to by the reference character 10, having handlebars 11 and a seat 12 mounted thereon in the usual manner. The front fork 13 diverges downwardly to act as a front support for the bicycle frame. Rear fork members 14 and 15 intersect at 16 and are attached to diverging rear supporting stands 17.

A wheel 20 rotatively mounted on an axle 21 fixed at the frame intersections 16 is of a diameter to substantially clear the supporting surface for the bicycle frame 10 and has a smooth flat periphery 22 which acts as a brake drum. The wheel 20 is rotatively propelled in a clockwise direction, corresponding to the forward locomotion of a bicycle, by a foot operated opposed crank means 23 journaled at the intersection of the frame bars 24 and 25 as is of usual bicycle construction. The crank means 23 has a sprocket 26 fixed thereto to transmit rotary motion to a sprocket 27 fixed to the wheel 20 through a chain 28 in the ordinary manner of bicycle rear wheel propulsion.

As best seen in Figs. 2 and 3, there is a differential force meter, referred to generally by the reference character 30, adjustably pivotally mounted on the bicycle frame 10. The differential force meter 30 includes a lever 31 having a bifurcated end with arms 32 and 33 straddling one extension of the fork member 14 and pivotally supported thereon as by a bolt 34. A right hand threaded bolt 35 having a knurled head portion 36 journaled in an opening 37 of an extension 38 on the fork member 14 above the bolt 34 cooperates with a threaded opening 39 in a nut 40 pivotally mounted by journal extension portions 41 in the arms 32 and 33 of the bifurcated portion of the lever 31 to cause a rotation of the lever 31 about its pivot 34 upon rotation of the bolt 35. A drum 42 is rotatably mounted on the end of the lever 31 opposite its pivot by a journaling means illustrated herein as a bolt 43 snugly fitted in a bore through the lever 31 and loosely passing through a central journaling opening of the drum 42 in a well known manner. Where it is desirable to obtain a very high degree of accuracy of indicated work load a "frictionless" type bearing means may be employed between the bolt 43 and the drum 42. The drum has an end surface 44 with indices 45 reading from 0 to 90 which, in this instance, represents the work load in foot-pounds. The indices 45 are arranged around the drum 42 in indicative cooperation with a pointer 46 that is integral with the lever 31. The drum 42 is biased in a counterclockwise direction by a spiral spring 47 that is attached on its inner end to the lever 31 by a stud 48 and on its outer end to the drum 42 by a stud 49. The drum normally rests with the 0 at the pointer 46, the counterclockwise rotation being arrested by a lug 50 (see Fig. 3) on the drum 42 engaging a similar lug 51 on the lever 31.

A band 52, consisting of metal or fabric tape or other desirable material, has an end 53 passing a very short distance clockwise around the periphery of the drum 42 and fastened thereto as by a rivet means 54. The band 52 passes substantially around the wheel 20 being in frictional engagement with the smooth flat periphery 22 thereof and has its opposite end 55 passing counterclockwise substantially around the periphery of the drum 42 in side by side relation to the end 53 and fastened thereto as by a rivet means 56. The end 55 must be fastened as far around the drum 42 as possible to permit a full scale reading on the drum yet the end 55 must not be so positioned as to ride under the band 52 contacting the drum tangentially to alter the workable lever arm.

The spiral spring 47 is of a strength, and the wheel size and number of turns per pedal turn is so calibrated and arranged that a direct reading may be taken in foot-pounds per pedal turn. Or, if the pedals are operated at a predetermined rate, as for example by pedaling in time to a metronome, the reading may be taken directly in foot-pounds per second or calibrated directly in horse-power.

In operation, the human subject mounts the bicycle ergometer in like manner as mounting an ordinary bicycle. The subject, upon pedaling in the forward direction, will cause the wheel 20 to rotate clockwise and frictionally drag the band 52 with it. The two ends of the band 52 being connected to the differential force meter in opposed relation permits the tensions on the two ends to mechanically evaluate the difference in forces or produce the net force on the drum 42 to be read from the single differential force meter dial 45, 46. The friction of the band 52 on the periphery 22 of the wheel 20 causes the tension in the end 55 to exceed that in the end 53, thus rotating the drum until the increased backward torque of the spiral spring 47 just balances the excess pull of the end 55, whereupon rotation of the drum 42 ceases at which time the work in foot-pounds will be registered by the indices 45 with relation to the pointer 46.

The work load may be varied by adjustment of the bolt 35 to vary the tension on the band 52. By turning the knurled head 36 clockwise the lever 31 will be rotated counterclockwise about its pivot stretching the band 52 tighter about the periphery 22 of the wheel 20 which will increase the net tangential force applied to the wheel and thus increase the work load which will be registered on the differential force meter 30 when the wheel 20 is being rotated clockwise.

Upon termination of operation of the bicycle ergometer the spiral spring 47 will return the drum 42 to its normal position of registering 0, the band 52 slightly rotating the wheel 20 in the reverse direction until the lug 50 is stopped by the lug 51. The rotation of the wheel 20 in the reverse direction will cause no injury to the device since the lugs 50 and 51 prevent any reverse injurious rotation of the drum 42 and the wheel 20 would merely slip in the band 52.

From the foregoing it may be seen that this bicycle ergometer is a useful contribution to the art of determining the power output of human subjects. While I have shown and described a single specific embodiment of this invention it is to be understood that other modifications and advantages, as well as details of construction, may be anticipated without departing from the spirit and scope of my invention.

I claim:

1. A bicycle ergometer assembly for measuring the work output of human subjects per pedal turn comprising: a bicycle-like frame arranged to rest in a stationary upright position; a wheel having a smooth periphery rotatably mounted in said bicycle-like frame; a lever member pivotally mounted on one end to the bicycle-like frame, said lever member being adapted to swing through an arc in which the free end thereof varies relative to the axis of said wheel; adjustable means for rotating said lever member through said arc; a differential torque responsive meter means including an indexed member movably mounted on said lever member and being biased in one direction of movement; and a band passing partially around the smooth periphery of said wheel and having two ends connected to said indexed member in such a manner as to apply forces to move said indexed member respectively in opposite directions, the resulting net force moving said indexed member against its bias to an extent proportional to the frictional force of said band on said wheel periphery upon forward rotation of said wheel wherein work proportional to the movement of said indexed member is performed in accordance with the tension placed on said band by said adjustable means.

2. In a dynamometer device, a wheel having a smooth flat periphery adapted to be propelled; a differential torque responsive meter means including a supporting member in adjustable relation with said wheel on which is rotatably mounted an indexed drum member internally biased in one rotative direction, a band passing partially around the periphery of said wheel and having its two ends connected to said indexed drum member about the periphery thereof in opposed relation so as to apply torques tending to move said indexed drum member respectively in opposite rotative directions, the resulting net torque arising from frictional tension of said band upon rotation of said wheel rotating said indexed drum member until the bias of said indexed drum member balances the resulting net torque, the adjustment of said supporting member relative to said wheel being adapted to vary the tension of said band for changing the net torque on said indexed drum, and said indexed drum member being calibrated in work units to directly indicate the work done by a predetermined rotational movement of said wheel.

3. A bicycle ergometer assembly for measuring the work output of human subjects comprising, a bicycle-like frame arranged to rest in a stationary upright position, a wheel having a smooth flat periphery rotatably mounted in the rear fork of said bicycle-like frame and adapted to be rotated by foot-operated means, a single differential torque responsive meter including a spring biased indexed drum rotatably mounted on a lever arm pivotally attached to said bicycle-like frame, said indexed drum being calibrated to register directly foot-pounds of work done per pedal turn of the ergometer, a band passing substantially around the smooth flat periphery of said wheel with its two ends passing partially around said indexed drum in opposite directions and fastened thereto, an adjusting means associated with said bicycle-like frame and said lever arm to rotate said lever arm about its pivot for varying the tension of said band whereby the operation of the foot operated means to rotate said wheel will frictionally force said band in a direction to rotate said drum against the bias of said spring until said spring bias balances said frictional force, and the balanced position of said indexed drum indicating the frictional tension of said band from which the work done per pedal turn may be deduced.

4. In a bicycle ergometer assembly for measuring the work output of human subjects in which there is a bicycle-like frame arranged to rest in a stationary position and having a foot propelled wheel with a smooth periphery associated therewith, the improvement comprising; a single differential torque responsive meter including an indexed drum rotatively mounted on a lever and spring biased in one rotative direction, said lever being pivotally mounted to the bicycle-like frame, a band passing substantially around the wheel frictionally engaging the periphery thereof and with its ends passing partially around said indexed drum in opposite directions and fastened thereto, an adjusting means associated with said bicycle-like frame and said lever to rotate said lever about its pivot for varying the tension of said band whereby wheel rotation will cause a difference of tension at the ends of said band, the net tension being in opposition to the spring bias of said indexed drum to rotate said indexed drum by an amount proportional to the net torque, and said indexed drum being calibrated in work units to directly indicate the work done by a predetermined rotational movement of said wheel.

5. In a bicycle ergometer assembly for measuring the work output of human subjects in which there is a bicycle-like frame arranged to rest in a stationary position and having a foot propelled wheel with a smooth flat periphery associated therewith, the improvement which comprises; a single differential torque responsive meter including a lever arm with a pointer integral therewith pivotally mounted on the bicycle-like frame and rotatively supporting a spring biased indexed drum, the indices of said drum being arranged in cooperative indicating relation with respect to said pointer, a band passing substantially around said wheel in cooperative frictional relation with respect to the smooth flat periphery thereof and having its two ends passing partially around said indexed drum in opposite directions and fastened thereto, a screw adjusting means associated with said bicycle-like frame and said lever arm for rotating said lever arm about its pivot to vary the tension of said band whereby varying the band tension will vary the torque load conditions upon wheel rotation which torque load will be indicated on said differential torque responsive meter, and said indicated torque load being directly proportional to the friction force of said band on said wheel periphery and therefore indicative of the work done per revolution of the ergometer foot propelled wheel.

VICTOR GUILLEMIN, JR.

REFERENCES CITED

The following references are of record in the file of this patent:

UNITED STATES PATENTS

| Number | Name | Date |
| --- | --- | --- |
| 403,995 | Gilman | May 28, 1889 |
| 562,198 | Robinson | June 16, 1896 |
| 2,238,295 | Snyder | Apr. 15, 1941 |

FOREIGN PATENTS

| Number | Country | Date |
| --- | --- | --- |
| 12,056 | Great Britain | A. D. 1897 |